United States Patent [19]

Suzuki

[11] Patent Number: 4,692,794
[45] Date of Patent: Sep. 8, 1987

[54] COLOR IMAGE SENSOR WITH PICTURE ELEMENTS EACH COMPRISING AN M×N MATRIX OF RED, GREEN, AND BLUE PHOTOELECTRIC CONVERSION ELEMENTS FEATURING CONTROLLABLE CHARGE STORAGE TIME AND SELECTIVE READOUT FOR EACH COLOR

[75] Inventor: Kenji Suzuki, Kanagawa, Japan

[73] Assignee: Fuji Photo Film Co., Ltd., Kanagawa, Japan

[21] Appl. No.: 830,115

[22] Filed: Feb. 18, 1986

[30] Foreign Application Priority Data

Feb. 18, 1985 [JP] Japan ................................. 60-28188

[51] Int. Cl.$^4$ ...................... H04N 9/077; H04N 9/04; G03B 27/80
[52] U.S. Cl. ...................................... 358/44; 358/41; 355/38
[58] Field of Search ....................... 358/41, 43, 44, 48; 355/35, 38

[56] References Cited

U.S. PATENT DOCUMENTS

| | | | |
|---|---|---|---|
| 4,277,799 | 7/1981 | Koike et al. | 358/44 |
| 4,367,492 | 1/1983 | Harada et al. | 358/44 |
| 4,553,159 | 11/1985 | Moraillon | 358/44 |
| 4,580,160 | 4/1986 | Ochi et al. | 358/44 |

FOREIGN PATENT DOCUMENTS

| | | | |
|---|---|---|---|
| 0157660 | 10/1985 | European Pat. Off. | 358/48 |
| 70625 | 6/1978 | Japan | 358/48 |
| 19493 | 1/1984 | Japan | 358/44 |
| 54384 | 3/1984 | Japan | |
| 637223 | 7/1983 | Switzerland | 355/38 |

Primary Examiner—James J. Groody
Assistant Examiner—Randall S. Svihla
Attorney, Agent, or Firm—Young & Thompson

[57] ABSTRACT

A color image sensor comprises a matrix of three kinds of photoelectric conversion elements for photoelectrically converting red, green, and blue color components of light, respectively, into signal charges and storing the same therein. In the matrix, the photoelectric conversion elements are grouped by m rows and n columns to form picture elements. Shift electrodes for photoelectric conversion elements corresponding to the same color are connected to one another. When a storage end signal is impressed on the shift electrodes corresponding to a selected color, the signal charges in the corresponding photoelectric conversion elements are transferred to and stored in CCDs. Color select switches are sequentially turned on so as to extract signal charges from CCDs corresponding to a selected color for each picture element in the matrix. The charges extracted from the CCDs in each picture element corresponding to the same color are simultaneously extracted and added together. The process is repeated for the other two primary colors. The period of time during which signal charges are stored in the photoelectric conversion elements for each color is controllable.

9 Claims, 6 Drawing Figures

COLOR IMAGE SENSOR WITH PICTURE ELEMENTS EACH COMPRISING AN M×N MATRIX OF RED, GREEN, AND BLUE PHOTOELECTRIC CONVERSION ELEMENTS FEATURING CONTROLLABLE CHARGE STORAGE TIME AND SELECTIVE READOUT FOR EACH COLOR

BACKGROUND OF THE INVENTION

The present invention relates to a color image sensor in which each of a multiplicity of picture elements comprises a plurality of photoelectric conversion elements one for each of the three primary colors, and in which color signals from the photoelectric conversion elements of the same picture element are simultaneously extracted to be added by color.

In the recent color printing art, color compensating filters are used to control the proportion of the primary color components of printing light for color correction in order to obtain well-balanced color prints. This control is carried out according to several groups of scenes into which color originals (positives or negatives) are classified based on their color characteristics. This classification of the color originals is effected in accordance both with the large area transmittance density (LATD) for each primary color (blue, green and red) component of light and with the densities of points on the color original for each primary color component of light. The LATD of the color original is obtained by measuring the light transmitted through the color original by an averaged light measuring method. The color originals whose LATDs for the three primary colors are substantially constant are used as standards. When printing from such standard color originals, the color compensating filters are adjusted to control the color components of light so that the light transmitted through the color original becomes gray as a result of integration, and this is known in the art as a gray integration printing method (LATD method).

On the other hand, the color originals of which any one of the LATDs for the three primary colors is abnormally different from the other are deemed color failure originals. Such color failure originals are classified based on their characteristics such as tints of their picture elements, the relationships between the locations thereof and the tints (the balance between the densities for the three primary colors) and the like into small groups, by using a fluorescent lamp, a tungsten lamp, having low color temperatures, having high color temperatures, having a change on standing, etc. For such color failure originals, the color compensating filters are adjusted according to the kinds of small groups to assure proper color correction.

For the classification of color originals, there is used in color printers a photographic density information gathering device which is adapted to measure the tints of 100 to 200 picture elements into which the scene of each color original is divided. Accordingly, it is important in this measurement to avoid the occurrence of a color registration error.

As image sensors of the type which stores charges produced by photoelectric conversion elements so that a large output can be extracted, there are known CCD-type, MOS-type and CPD-type, solid state imaging devices. In addition, there are known storage type color image sensors which comprise photoelectric conversion elements integrated with color filters of blue, green and red arranged on a single plate. When using this single-plate image sensor for measuring the primary color components of light, because all of the photoelectric conversion elements measure the transmitted light through different points of the color original, an unavoidable color registration error occurs. A way of solving the color registration error problem is to provide that each picture element comprises a plurality of photoelectric conversion elements one for each primary color (blue, green and red) and then to extract the color signals from the photoelectric conversion elements in sequence by color, and finally to add up the color signals of the same picture element by color.

There is, however, a problem in such color image sensors that, since signals from the color image sensor are extracted in a time series for every horizontal row of photoelectric conversion elements, there is the necessity to provide an analog data memory which can simultaneously store color signals extracted from a plurality of horizontal rows of photoelectric conversion elements and an adder for adding up the color signals from different rows and columns of photoelectric conversion elements. This provision of the analog data memory and the adder makes the color image sensor complicated.

As is described in, for example, Japanese Kokai No. 59-54384, it is known that the dynamic range of an image sensor can be expanded by changing its storing period (light converions period). Therefore, in color image sensors, low-noise color signals can be obtained by measuring the primry color components of light for different storing periods by color. In the above-described conventional color image sensors, however, it is impossible to change the storing period by color. The reason is that signals of the three primary colors from the image sensor are extracted mixed, from each horizontal row of photoelectric conversion elements. Furthermore, when considering the logarithmic transformation of color signals, and the stable extraction of color signals which is achieved by operating the system using the color image sensor with some sufficient allowance for operational timing, and the like, it is desirable to perform the extraction of color signals as slowly as possible. Such slow signal extraction makes it possible to utilize inexpensive signal processing circuits with low operation speeds, thereby decreasing the manufacturing cost of the system. For these reasons, it is preferable that the storing period for signal charges and the initiation of signal extraction can be determined independently for each color.

OBJECTS OF THE INVENTION

It is therefore an object of the present invention to provide a color image sensor which can measure the three primary color components of the light transmitted through each picture element without a color registration error.

It is another object of the present invention to provide a color image sensor in which the same color signals from the same picture element can be additively extracted, but which is nevertheless simple in its structure.

It is a further object of the present invention to provide a color image sensor in which the storing period of signal charges and the time of initiation of the signal extraction are changeable by color.

SUMMARY OF THE INVENTION

For achieving these and other objects of the present invention, there is provided a color image sensor as will be described hereinbelow. Such a color image sensor comprises photoelectric conversion elements for storing electric charges by photoelectrically converting the three primary color components of light, the photoelectric conversion elements for the three primary colors being arranged in a certain order to form a matrix. This matrix of photoelectric conversion elements is divided into m × n (m and n are positive integers and at least one of them is equal to or larger than three) size small matrices each of which forms a single picture element. The picture elements are scanned in a predetermined order to provide signal charges corresponding to the charges stored in the photoelectric conversion elements. At this time, signal charges from the same picture element are added up and then extracted by color.

According to one preferred embodiment of the present invention, there are provided CCDs in the color image sensor for each photoelectric conversion element, in order to complete the storage of signal charges and extract color signals independently for each color. The signals memorized in these CCDs are added by color and by picture element and then extracted.

When using CCDs in order to add the signals, the CCDs are provided in the image sensor as storage means in each picture element, one for every primary color. The signal charges of the color which is selected by means of a color select signal are transferred to the storage means from the CCDs. The signal charges of the same color stored in the CCDs are simultaneously transferred to the storage means by picture elements, and are added and then extracted. The extraction of the resulting signals is performed by means of analog switches which are scanned by horizontal and vertical scanning signal generators. Alternatively, the extraction of signals can be performed by using as the storage means CCD-analog shift registers whose signal charges are transferred to a read-out part by clock pulses.

On the other hand, when using MOS transistors in order to add the signals, there are provided in the image sensors CCDs, one for every photoelectric conversion elements, which are scanned by means of vertical and horizontal scanning signal generators. The CCDs of the same color arranged in one vertical row are connected to a vertical line and to an output line through a color select switch which is turned ON with a color select signal. A picture element from which signals are to be extracted is specified by the vertical and horizontal scanning signal generators, and the color of the signals to be extracted is selected with a color select signal, whereby the signals for each primary color are added and then extracted, by picture elements, through the output line.

According to the present invention, the color image sensor comprises a number of picture elements each of which includes, for each primary color, a plurality of photoelectric conversion elements for storing charges by photoelectrically converting each color component of light, so as to avoid the occurrence of a color registration error, thereby making possible the measurement of the tint of each picture element. In addition, since the signals of the same color can be added and then extracted from the same picture element, the circuit structure of the color image sensor is simpler in comparison to one in which signals are extracted by line and then added. Furthermore, there are provided CCDs, one for every photoelectric conversion element, for memorizing the signal charges stored in the photoelectric conversion elements, so that the storing periods of signal charges and the starting times of the extraction of signal charges can be established independently from each color. These independent storing periods make it possible to expand the dynamic range of the color image sensor, resulting in low-noise signals. On the other hand, this independent starting time of the signal extraction makes it possible to extract color signals by color. As a result of this, since it is permissible to extract color signals at a slow speed, it is possible to operate the system using the color image sensor with sufficient allowance for operational timing, so as to realize the stable extraction of color signals and the use of inexpensive signal processing circuits with low operation speeds which can greatly decrease the manufacturing cost of the system.

It should be noted that the present invention is applicable not only to the additive color process but also to the subtractive color process.

DETAILED DESCRIPTION OF THE INVENTION

Figure 1:
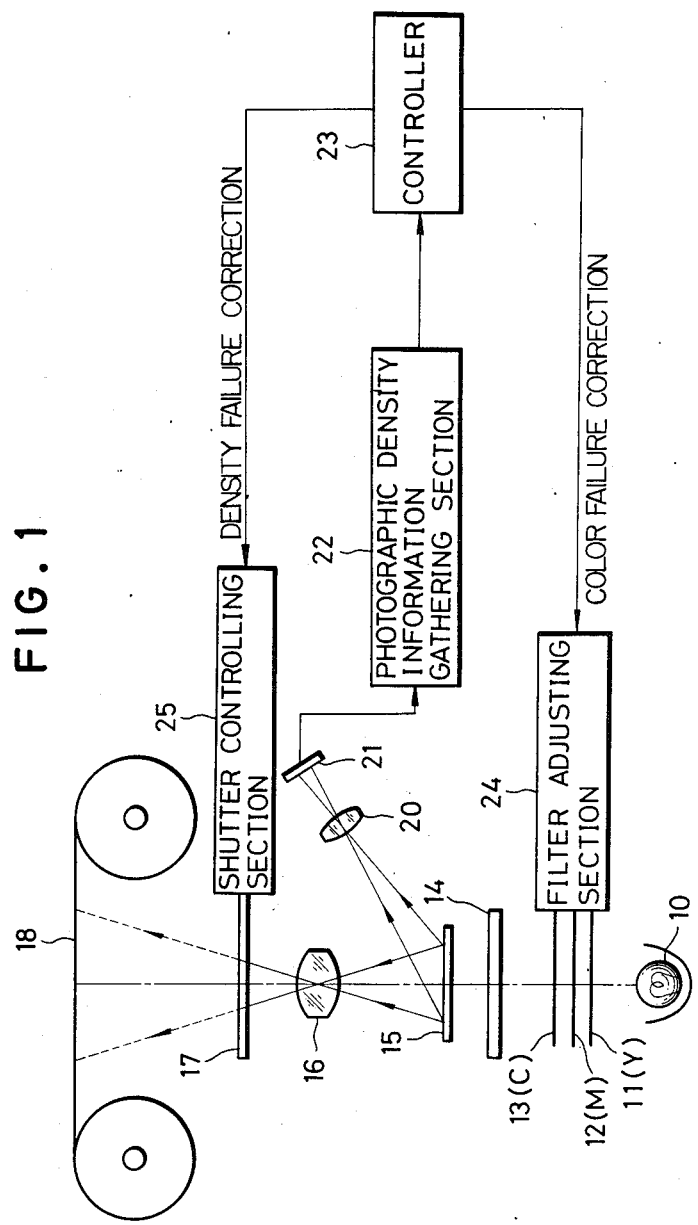
FIG. 1 is a schematic view showing a color printer in which a color image sensor according to the present invention is used.

Referring now to FIG. 1 showing a color printer incorporating a color image sensor according to the present invention, there are three color filters 11, 12, 13, namely yellow (Y), magenta (M) and cyan (C). Each color filter 11, 12, 13 is controllably insertable independently of the other two between an illumination lamp 10 and a diffusion plate 14. The white light from the lamp 10 passes through the color filter 11, 12 or 13 to the diffusion plate 14 and is diffused thereby. The diffused light, after passing through a color original or negative 15, is focused on a color paper 18 by means of the enlarging lens 16 to create a latent image of the color original under the control of a shutter 17. The enlarging lens 16 can be moved axially in a well known manner to vary the magnification.

A lens 20 is provided out of the optical path of the illumination light in such a way that the image of the color original 15 is focused on a color image sensor 21 of the type which stores electric charges produced by photoelectric conversion. This color image sensor 21, as is described in detail later, photographically converts light incident thereon to electric signals which in turn are directed as photographic density information to a photographic density information gathering section 22 wherein the electric signals of every primary color are integrated by picture element to calculate the large area transmittance densities (which are hereinafter referred to as LATDs) of the color original 15 for the respective primary colors.

Based on the LATDs and the tint (the balance between densities of the three primary colors) of the respective picture elements of the color original 15, the color original 15 is classified in accordance with whether the color original 15 is standard, or includes a color failure or a density failure. According to the result of this classification, a controller 23 causes a filter adjusting device 24 to adjust the amount of insertion of each color filter 11, 12, 13 into the optical path for color correction if the color original includes a color failure, and a shutter controlling device 25 to control the opening time of the shutter 17 for regulating the quantity of light if the color original 15 includes a density failure. It is of course intended to print from the color original 15, if standard, by the gray integration printing method (LATD method) which is well known in the color printing art.

Figure 2:
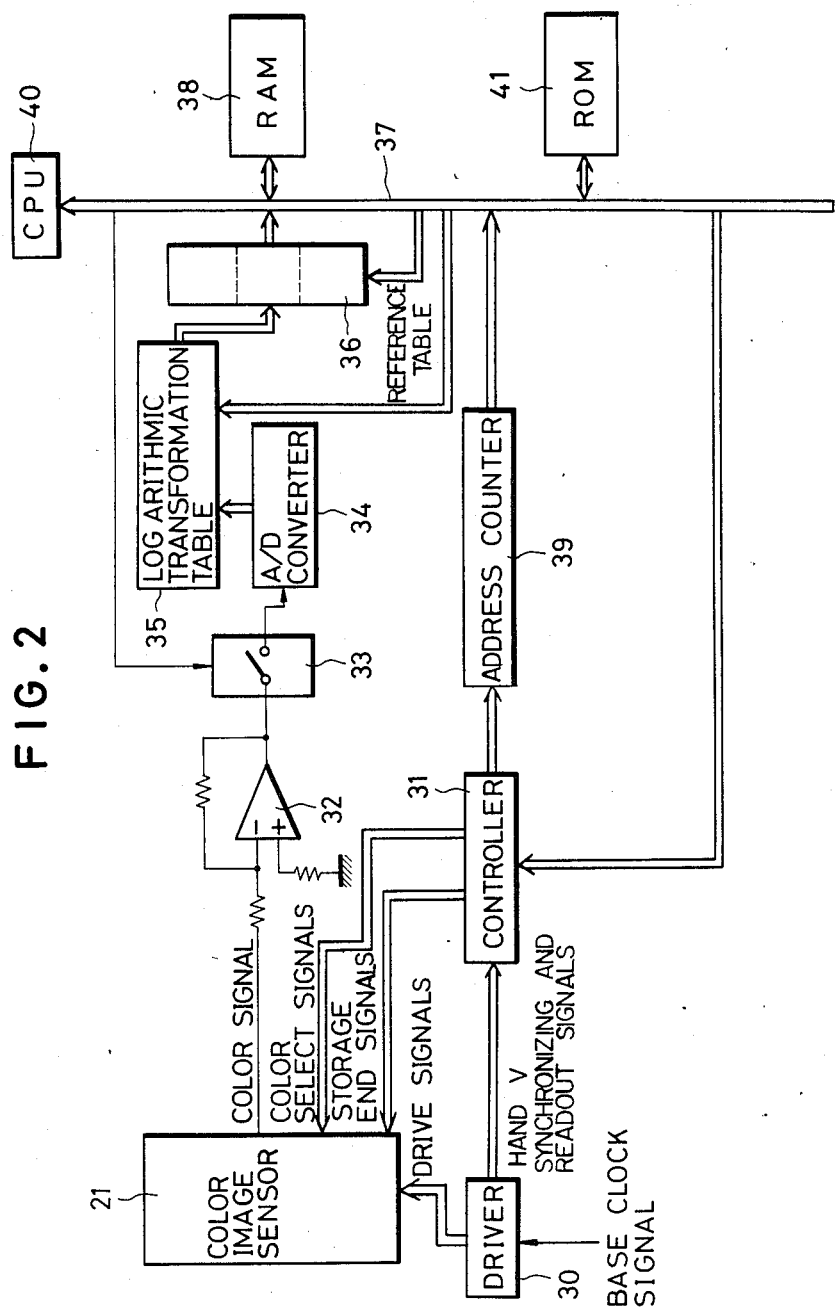
FIG. 2 is a block diagram of a photographic density data gathering device with which the color image sensor according to the present invention cooperates.

Referring to FIG. 2, there is shown an example of the photographic density information gathering section 22. A driver 30 which receives base clock signals provides horizontal and vertical synchronizing signals and readout signals that are all sent to a controller 31 as well as drive signals sent to the color image sensor 21. The controller 31 sends to the color image sensor 21 storage end signals (shift signals) for stopping the storage of charges in the photoelectric conversion elements and color select signals for selecting the color whose color signals are to be extracted.

The color image sensor 21 extracts the color signals of the respective picture elements in order, for every selected color. The color signals, after being amplified by an amplifier 32, are transferred to an A/D converter 34 through analog switch 33 which is turned OFF only when resetting the color image sensor 21 after having extracted the color signal at a high speed.

The A/D converter 34 converts the color signals transferred into 8-bit signals which in turn are sent to a logarithmic transformation table 35 comprised of fifteen transformation tables. According to the base density of the color original 15 or the storage period of charges in the color image sensor 21, one of the fifteen transformation tables is selected so as to logarithmically transform the 8-bit digital signals into corresponding density value signals. The density value signals thus obtained are then sent to a reference table 36 having table memories of three different colors. The table 36 standardizes the density value signals with reference to the table memories so that compensable Y values and the sensitivity of color original 15 are compensated. The standardized data are transferred through a bus line 37 to and written directly in a RAM 38 at a particular memory address indicated by an address counter 39. A CPU 40 functions according to the programmed instruction written in a ROM 41 to control the operations of the components of the photographic density information gathering section 22.

Figure 3:
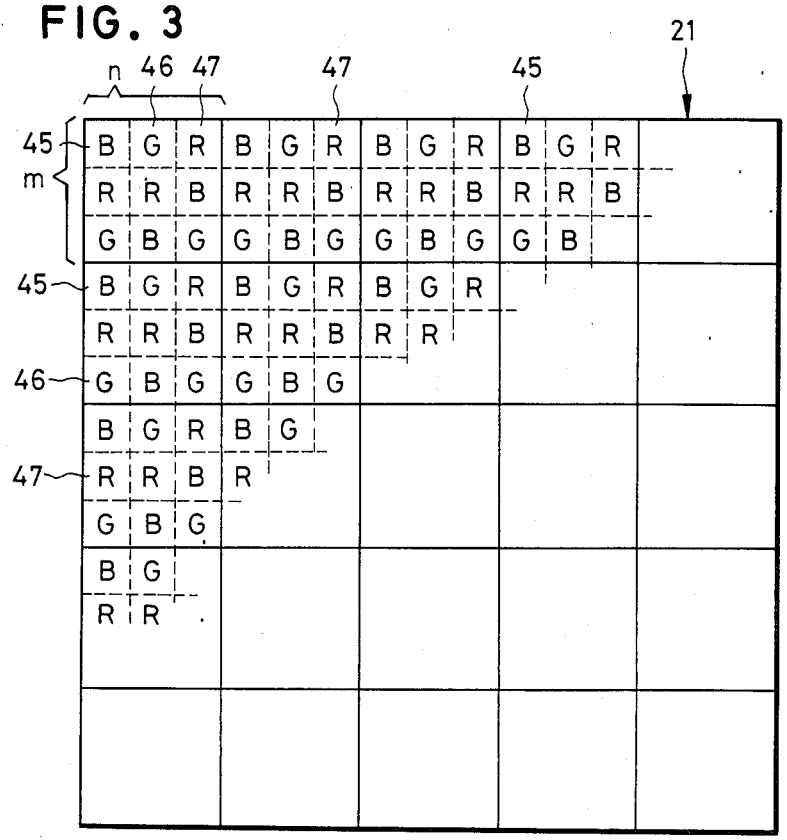
FIG. 3 is a schematic explanatory view showing the arrangement of the picture images of the color image sensor according to the present invention.

Reference is now had to Fig.3 showing by way of an example the arrangement of photoelectric conversion elements of the color image sensor 21. The color image sensor 21 is comprised of a large number of photoelectric conversion elements 45, 46, 47 of the three primary colors, namely, blue (B), green (G) and red (R) which are regularly arranged in a certain order. The photoelectric conversion elements are grouped in matrices, each of which includes m photoelectric conversion elements per column and n photoelectric conversion elements per row to form a single picture element in order to eliminate the occurrence of a color registration error. In this embodiment, the individual picture element is comprised of nine photoelectric conversion elements, three for each primary color, arranged in a 3×3 matrix. In FIG. 3, the respective photoelectric elements and single picture elements are shown in dotted line and in solid line. As is well known in the art, these photoelectric conversion elements 45, 46, 47 are combined with color separation filters for blue, green and red.

Figure 4:
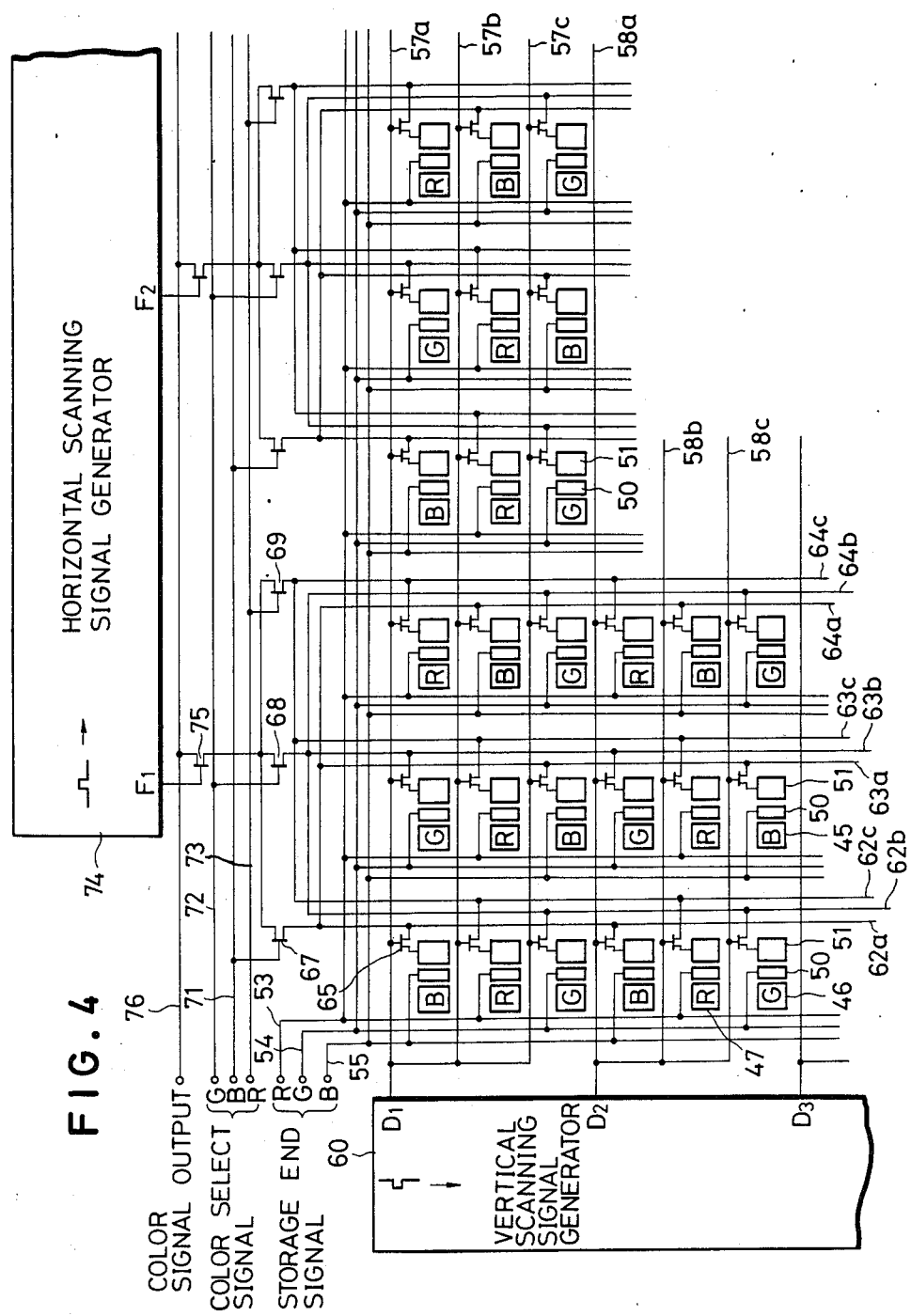
FIG. 4 is a circuit diagram showing an example of a color image sensor according to the present invention.

Referring now to FIG. 4, there is shown the essential part of the color image sensor 21 according to the present invention wherein the photoelectric conversion elements of the three primary colors are arranged in a certain order to form a matrix. Placed by the side in each photoelectric conversion element are a shift electrode 50 and a CCD 51. The shift electrode 50 functions to transfer signal charges stored in the related photoelectric conversion element to the CCD 51 when a storage end signal is impressed thereon. In order to change the storing period of signal charges of the three primary colors independently from one another, every column of shift electrodes 50 is connected to three signal lines 53, 54, 55 separately by colors.

For scanning simultaneously three rows of photoelectric conversion elements included in a single picture element in the first row, the first three horizontal lines 57a, 57b, 57c are connected to one another and to the first stage output terminal D1 of a vertical scanning signal generator 60. In order to scan simultaneously three rows of photoelectric conversion elements included in a signal picture element in the second row, the next three, namely from fourth to sixth, horizontal lines 58a, 58b, 58c are connected to one another and to the second stage output terminal D2. In the same way every group of three horizontal lines is connected to a respective stage output terminal of the vertical scanning signal generator 60. Along the first vertical row of photoelectric conversion elements 45, 46, 47, there are three vertical lines 62a, 62b, 62c of the three primary color signals, one for every primary color to which the CCDs 51 are connected separately by color through switching MOS transistors 65 for extracting the color signals, respectively. In the same way, along every vertical row of photoelectric conversion elements, three vertical lines, for example 63a, 63b, 63c for the second and 64a, 64b, 64c for the third, are provided to connect the CCDs thereto separately by color through switching MOS transistors 65.

For the simultaneous extraction and addition of the same color signals from photoelectric conversion elements in a single picture element, the vertical lines 62a-64a, 62b-64b, 62c-64c are grouped by color and each group of the vertical lines is connected to a color select switch 67, 68, 69. These color select switches 67, 68, 69 at their gate are connected to signal lines 71, 72, 73, respectively and are connected in series to a horizontal scanning switch 75 which at its gate is connected to the first stage output terminal F1 of a horizontal scanning signal generator 74. In the same way, every color of three vertical lines is connected to the color select switch connected to the signal line of the corresponding color. And every group of three color select switches is connected in series to a respective horizontal scanning switch 75 which at its gate is connected to a corresponding stage output terminal of the horizontal scanning signal generator 74.

Figure 5:
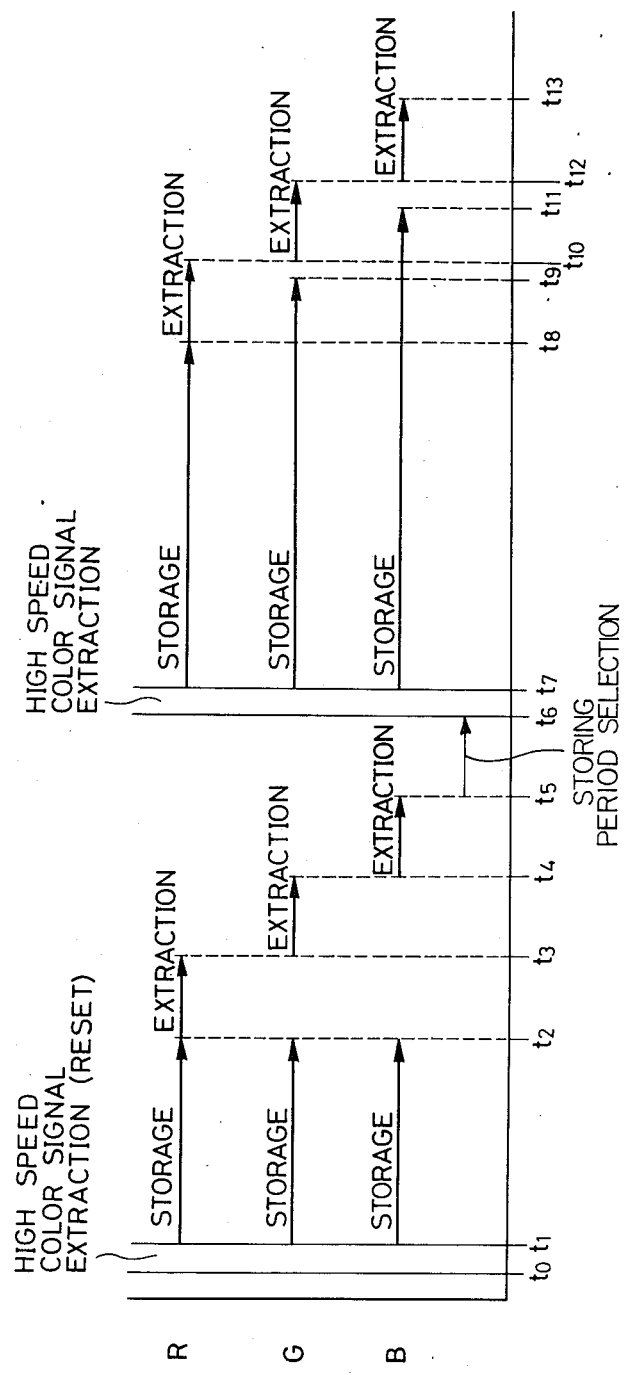
FIG. 5 shows an example of a timing chart of the storage of signal charges and the extraction of color signals.

FIG. 5 shows an example of a timing chart for the storage of signal charges and the extraction of color signals. At the outset, it is necessary to cancel residual signal charges in the photographic conversion elements at a high speed for resetting the color image sensor 21. For this purpose, the horizontal scanning signal generator 74 is scanned at a high speed whole stages at a time when there are color select signals on the signal lines immediately after the simultaneous delivery of storage end signals to the signal lines. At the end of the whole stage scanning of the horizontal scanning signal generator 74, the vertical scanning signal generator 60 is scanned through one stage so as to extract color signals from one horizontal row of picture elements. In such a way, when the vertical scanning signal generator 60 is scanned by whole stages, the residual signal charges are extracted as unusable color signals, which are inhibited from being transferred to the A/D converter 34 by turning the analog switch 33 OFF. As a result of this, the color image sensor 21 is reset to its initial condition. This high speed signal extraction is performed in an extremely short time between times $t_o$ and $t_1$.

After having emptied the individual photoelectric conversion element, the color image sensor 21 is exposed to light incident thereupon for the period between times $t_1$ and $t_2$ to store in the photoelectric conversion elements charges corresponding to the incident light. At the time $t_2$, stored charge end signals are impressed simultaneously on all of the shift electrodes 50 through the signal lines 53, 54, 55 so as to transfer the signal charges in the corresponding photoelectric conversion elements to the corresponding CCDs 51.

When the color signals of red are extracted, a color select signal is impressed on the signal line 73 so as to turn the color select switch 69 ON. As previously described, the vertical and horizontal scanning signal generators 60, 74 scan CCDs 51 by threes in both row and column and so scan horizontal rows of picture elements by rows. Therefore, the first row of picture elements is scanned. Consequently, at first, the color signals of red are additionally extracted from the three CCDs 51 disposed beside the photoelectric conversion elements for red in the picture element of the cell in the first row and the first column of the picture element matrix through the vertical lines 62c, 63c, 64c which are connected to the color selection switch 69. The resulting color signal of red from the picture element is retrieved through the output line 76. After this, the horizontal scanning signal generator 74 then scans the vertical lines connected to the second stage output terminal $F_2$ to extract the color signals of red from teh CCDs 51 in the picutre element of the cell in the first row and the second column of the picture element matrix. In the same way, the color signals of red are extracted form the first rows of picture elements in order. The same procedure is repeated for every row of picture elements, whereby the resulting color signals of red from all the respective picture elements are extracted for the period between times $t_2$ and $t_3$. Each resulting color signal of red is processed through the A/D converter 34, the logarithmic transformation table 35 and reference table 36 and then written in the RAM 38.

In much the same way as described for the extraction of the red color signals, the color signals of green and blue can be extracted for the periods between times $t_3$ and $t_4$, and $t_4$ and $t_5$, respectively.

As to the color signals of every color written in the RAM 38, a maximum value (the brightest point on the color original) is detected to determine the dynamic range of the color image sensor according to which one of the fifteen steps of the storage periods is selected. This storage period selection is carried out between the times $t_5$ and $t_6$.

After the selection of storing period for the respective color, the photoelectric conversion elements for red are stored with signal charges for the period between times $t_7$ and $t_8$ after being emptied during the period between times $t_6$ and $t_7$. At the time $t_8$, the signal charges in the photoelectric conversion elements for red are transferred to the CCDs 51 by impressing a storage end signal on the corresponding shift electrodes through the signal lines 53 and are immediately extracted therefrom by picture elements.

During the extraction of the red color signals, the storage of signal charges in the photoelectric conversion elements 46 for green is stopped at the time $t_9$ by impressing a storage end signal on the shift electrodes through the signal line 54. However, the extraction of the green color signals is suspended until the time $t_{10}$ because of the dependency of the red color signal extraction. Between the times $t_{10}$ and $t_{12}$, the green color signals are extracted. At the time $t_{11}$, the photoelectric conversion elements for blue cease to be stored with electric charges. The extraction of the blue color signals is suspended until the extraction of the green color signal is completed at the time $t_{12}$ and then carried out for the period between the times $t_{12}$ and $t_{13}$.

Figure 6:
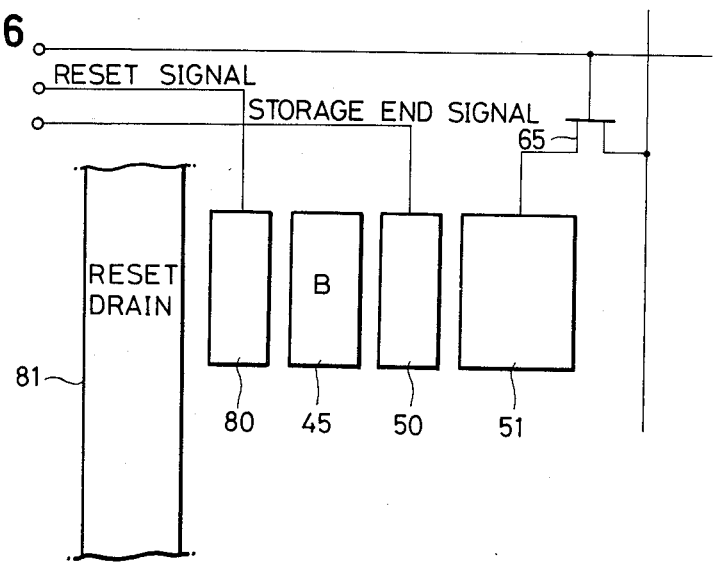
FIG. 6 is a schematic illustration showing another example of the color image sensor according to the present invention in which a shift electrode for resetting is provided.

In general, although the time required to store signal charges is about one to 500ns, it is enough for the extraction of signals to allot about one ms. Therefore, in practice, the high speed extraction of color signals is completed instantaneously. When it is required to discharge signal charges at a high speed, there are provided a shift electrode 80 for resetting and a reset drain 81 by the side of the photoelectric conversion elements, for example the photoelectric conversion element 45 for blue, as shown in FIG. 6. Upon impressing a reset signal on the resetting shift electrode 80, the charges stored in the photoelectric conversion element are discharged into the reset drain 81. Therefore, it is possible to reset the photoelectric conversion elements by color in case resetting shift electrodes for the same color photoelectric conversion elements are connected to one another. The provision of the resetting shift electrodes 80 connected to one another by color makes it possible to set the starting time of the storage of charges by color so as to avoid waiting time for the extraction of color signals, thereby making it possible to eliminate noise which increases with time during the waiting time for the extraction of signals.

As many apparently widely different embodiments of this invention may be made without departing from the spirit and scope thereof, it is to be understood that the invention is not limited to the specific embodiment thereof except as defined in the appended claims.

What is claimed is:

1. A color image sensor comprising:
   three kinds of photoelectric conversion elements (45, 46, 47) for photoelectrically converting three primary color components of light, respectively, into signal charges and storing the signal charges therein, said photoelectric conversion elements being arranged in a predetermined order to form a matrix of picture elements, each picture element comprising a matrix of m rows and n columns of said photoelectric conversion elements, m and n being positive integers at least one of which is at least three;

means (60, 65, 74, 75) for scanning said picture elements one by one in order to extract said stored signal charges from said photoelectric conversion elements making up said picture elements as color signals;

means (67, 68, 69, 71, 72, 73) for specifying which of said three kinds of photoelectric conversion elements is subjected to said extraction of said stored signal charges; and means (62a, 62b, 62c, 63a, 63b, 63c, 64a, 64b, 64c) for adding together the stored signal charges extracted from the photoelectric conversion elements of each picture elements as it is scanned by said scanning means such that stored signals extracted from the same kind of photoelectric conversion element are added together.

2. A color image sensor as defined in claim 1, further comprising a plurality of CCDs (51) for storing signal charges transferred from said photoelectric conversion elements, and a plurality of shift electrodes (50) equal in number to said plurality of CCDs for transferring said signal charges stored in said photoelectric conversion elements to said CCDs at the end of a period during which said signal charges are stored in said photoelectric conversion elements.

3. A color image sensor as defined in claim 2, further comprising a reset drain (81) for discharging said signal charges stored in said photoelectric conversion elements and a plurality of reset shift electrodes (80) for transferring said signal charges stored in said photoelectric conversion elements to said reset drain.

4. A color image sensor as defined in claim 3, wherein each of said shift electrodes (50) is connected to one of three shift lines (53, 54, 55) such that shift electrodes corresponding to the same kind of photoelectric conversion element are connected to the same shift line, thereby enabling voltages with different timings to be applied to the shift electrodes corresponding to the different kinds of photoelectric conversion elements.

5. A color image sensor comprising:
three kinds of photoelectric conversion elements (45, 46, 47) for photoelectrically converting three primary color components of light, respectively, into signal charges and storing the signal charges therein, said photoelectric conversion elements being arranged in a predetermined order to form a matrix of picture elements, each picture element comprising m rows and n columns of said photoelectric conversion elements, m and n being positive integers at least one of which is at least three;

a plurality of CCDs (51), one for each of said photoelectric conversion elements, for storing signal charges transferred from said photoelectric conversion elements;

a plurality of shift electrodes (50), equal in number to said plurality of CCDs, disposed between each said photoelectric conversion element and its corresponding CCD for transferring said signal charges stored in said photoelectric conversion elements to said corresponding CCDs upon being impressed with storage end signals;

signal extraction switches (65) equal in number to said plurality of CCDs for extracting said signal charges stored in said CCDs;

three vertical lines (62a, 62b, 62c), one for each of said three kinds of photoelectric conversion elements, provided for each column of photoelectric conversion elements in said matrix of picture elements, each of said vertical lnes interconnecting signal extraction switches corresponding to one kind of photosensitive conversion element;

vertical scanning signal generating means (60) for turning ON said signal extraction switches such that signal extraction switches corresponding to m rows of said photoelectric conversion elements are turned ON at a time;

color select switches (67, 68, 69) corresponding to said three kinds of photoelectric conversion elements, said color select switches being connected to said vertical lines such that each color select switch is connected to all of the vertical lines (62a, 63a, 64a; 62b, 63b, 64b; 62c, 63c, 64c) corresponding to one kind of photoelectric conversion element in a different group of a plurality of groups of n columns of said photoelectric conversion elements, said color select switches being sequentially turned ON in accordance with a specified kind of photoelectric conversion element corresponding to CCDs from which signal charges are to be extracted such that all of the color select switches corresponding to one kind of photoelectric conversion element are sequentially turned ON and then all of the color select switches corresponding to a different kind of photoelectric conversion element are sequentially turned ON;

a plurality of scanning switches (75), one for each group of said plurality of groups of n columns of said photoelectric conversion elements, said scanning switches being connected to said color select switches such that each scanning switch is connected to all of the color select switches corresponding to a different group of said plurality of groups of n columns of said photoelectric conversion elements;

horizontal scanning signal generating means (74) for sequentially turning ON said scanning switches; and an output line (76) connected to all of said scanning switches for outputting signal charges extracted from said CCDs corresponding to said specified kind of photoelectric conversion element.

6. A color image sensor as defined in claim 5, wherein said three kinds of photoelectric conversion elements are photoelectric conversion elements for photoelectrically converting a blue color component of light into blue color signal charges and storing said blue color signal charges, photoelectric conversion elements for photoelectrically converting a green color component of light into green color signal charged and storing said green color signal charges, and photoelectric conversion elements for photoelectrically converting a red color component of light into red color signal charges and storing said red color signal charges.

7. A color image sensor as defined in claim 6, wherein both m and n are three and each picture element comprises three photoelectric conversion elements for photoelectrically converting each of said blue, green, and red color components of light into blue, green, and red color signal charges, respectively.

8. A color image sensor as defined in claim 7, wherein all of said shift electrodes corresponding to the same kind of photoelectric conversion element are connected together to enable storage end signals with different timings to be applied to the shift electrodes corresponding to the different kinds of photoelectric conversion elements in order to control the periods during which signal charges are stored in each kind of photoelectric conversion element.

9. A color image sensor as defined in claim 5, further comprising a reset drain (81) for discharging said signal charges stored in said photoelectric conversion elements and a plurality of reset shift electrodes (80) for transferring said signal charges stored in said photoelectric conversion elements to said reset drain.

* * * * *